(12) United States Patent
McKenzie

(10) Patent No.: US 7,931,524 B2
(45) Date of Patent: Apr. 26, 2011

(54) HUNTER ARM

(76) Inventor: Keith McKenzie, Halfmoon Bay (CA)

( * ) Notice: Subject to any disclaimer, the term of this patent is extended or adjusted under 35 U.S.C. 154(b) by 0 days.

(21) Appl. No.: 12/871,906

(22) Filed: Aug. 30, 2010

(65) Prior Publication Data

US 2011/0053482 A1 Mar. 3, 2011

Related U.S. Application Data

(60) Provisional application No. 61/238,205, filed on Aug. 30, 2009.

(51) Int. Cl.
*A22C 21/00* (2006.01)
(52) U.S. Cl. ...................................................... 452/187
(58) Field of Classification Search .................. 452/185, 452/187–192, 198; 414/462, 539–543; 212/179, 212/180, 294, 299; 254/325, 283, 284, 335; 224/321, 518–521
See application file for complete search history.

(56) References Cited

U.S. PATENT DOCUMENTS

| | | | |
|---|---|---|---|
| 4,806,063 A | 2/1989 | York | |
| 5,788,095 A | 8/1998 | Watson | |
| 5,791,858 A * | 8/1998 | Sasser | 414/462 |
| 6,089,431 A | 7/2000 | Heyworth | |
| 6,109,855 A | 8/2000 | Vela-Cuellar | |
| 6,202,864 B1 * | 3/2001 | Ernst et al. | 211/70.6 |
| 6,250,483 B1 * | 6/2001 | Frommer | 212/180 |
| 6,705,821 B2 * | 3/2004 | Philipps et al. | 414/462 |
| 6,921,007 B1 | 7/2005 | Guerrant | |
| 7,059,955 B2 * | 6/2006 | Green et al. | 452/189 |
| 7,374,388 B2 * | 5/2008 | Holt | 414/462 |
| 7,476,149 B2 * | 1/2009 | Burrows | 452/187 |
| 2004/0214515 A1 | 10/2004 | Skarlupka, IV et al. | |
| 2005/0175418 A1 | 8/2005 | Johnson | |
| 2007/0248443 A1 | 10/2007 | Stucks | |

* cited by examiner

*Primary Examiner* — Thomas Price
(74) *Attorney, Agent, or Firm* — Thien Tran; Access Patent Group, LLC

(57) ABSTRACT

A hunter arm includes a bottom bar having a first end adapted for insertion into a trailer hitch of a pickup truck. A mast has a lower end pivotally attached by a first knuckle to a second end of the bottom bar. A first brace member has a lower end pivotally attached near the first end of the bottom bar and an upper end pivotally attached near the lower end of the mast to keep the mast in a vertical position. A boom has a first end pivotally attached by a second knuckle to an upper end of the mast. A second brace member has an upper end pivotally attached to center of the boom. An angle adjustment plate has a plurality of longitudinal notches there along affixed to the mast. A lower end of the second brace member can engage with any one of the notches in the angle adjustment plate to vary the angle of the boom extending outwardly from the mast. A pulley assembly has an upper end connected in a removable manner to a second end of the boom. A spreader bar includes two hooks which allows animal to hang down from the spreader bar to be skinned.

9 Claims, 4 Drawing Sheets

HUNTER ARM

CROSS-REFERENCE TO RELATED APPLICATION

This application claims the benefit of Provisional Patent Application No. 61/238,205, filed on Aug. 30, 2009, in the United States Patent & Trademark Office, the disclosure of which is incorporated herein by reference.

BACKGROUND OF THE INVENTION

1. Field of the Invention

The present invention relates to an animal hanger rack, and more particularly, a hunter arm.

The present invention is an apparatus that can be utilized to aid outdoorsmen in quickly skinning an animal while it hangs from the back of their truck. The hunter arm can assist individuals in quickly and easily removing the skin of a recently killed animal without searching for a tree to hang the carcass for skinning purposes. The present invention is ideal for any hunter so they may remove the skin of an animal in a timely fashion outdoors without the use of a tree.

2. Description of the Prior Art

In order to hang a carcass for skinning, individuals may spend a large amount of time and gas driving around looking for an adequate tree. Transporting an animal to one's home for cleaning can also be a tedious process. After skinning the animal at one's residence, they may then have to find a way to dispose of the leftover carcass. Having a simple way to hang an animal from one's truck so it can easily be cleaned shortly after being killed may assist hunters in saving time and energy when skinning animal.

Numerous innovations for portable animal hoist and skinning devices have been provided in the prior art that will be described. Even though these innovations may be suitable for the specific individual purposes to which they address, however, they differ from the present invention.

A FIRST EXAMPLE, U.S. Pat. No. 4,338,703, Issued on Jul. 13, 1982, to Tanner teaches a supporting device, particularly for game animals, which comprises first and second elongated members. A first end of the second elongated member is attached perpendicularly to a first end of the first member. A first, stationary cross bar is attached perpendicularly to a second end of the second member. In a preferred embodiment, of the present invention the first elongated member is rotatably received within a sleeve. In a further preferred embodiment a second cross bar, movable toward and away from the first, stationary cross bar, is displaced by a cable and a winch. A pair of chains having ends of the stationary and second movable cross bar passed through appropriate links of each of the chains selectively holds the movable cross bar against downward vertical movement with respect to the stationary cross bar and limits pivotal and rotational movement of the movable cross bar about the cable. The supporting device of the present invention is adapted to be received in a slot typically provided in a side wall of a bed of a truck or attached to a screw arranged on any suitable support device. In a simplified embodiment of the present invention, the movable cross bar, the chains, the cable, and the winch are eliminated and the stationary cross bar is used to support an animal. In addition, a pair of braces are arranged to further stabilize the stationary cross bar.

A SECOND EXAMPLE, U.S. Pat. No. 4,806,063, Issued on Feb. 21, 1989, to York teaches a portable wild game hoist having a multiple section boom which can be assembled and dismantled. The boom is supported at its lower end by a standard trailer hitch mounted on the rear of a vehicle. Straps are secured to the upper section of the boom and terminate in hooks at their distal ends which are adapted to mate with the edges of the fenders of the vehicle. A torsion bar is adjustably secured to one section of the boom so that is bears against the rear body or tailgate of the vehicle. A rope extends from a winch secured to the boom through a pulley at the distal end of the boom. The rope supports a hanger with hooks for supporting the animal from its rear hooves. In a further embodiment, the boom may be supported by a base resting on the ground and stabilized by the trailer hitch. In both embodiments, the boom is comprised of a plurality of mating sections.

A THIRD EXAMPLE, U.S. Pat. No. 5,211,601, Issued on May 18, 1993, to Cope teaches a mechanical device for removing the skin from whitetail deer or other game animals of similar size. This invention is self-supporting and needs no assistance from tree limbs or other permanent overhead structures as conventional methods. With the skin holders the skin is held stationary while the carcass is lifted and pulled from the skin. The carcass is pulled from the skin by mechanical means as compared to the skin being pulled from the carcass by hand with the present method.

A FOURTH EXAMPLE, U.S. Pat. No. 5,788,095, Issued on Aug. 4, 1998, to Watson teaches a boom and mast apparatus that includes a transverse support member which has a proximal portion and a distal portion. A longitudinal mast assembly is connected to the distal portion of the transverse support member. The longitudinal mast assembly includes a support-member-connected end and a boom-member-connected end. The longitudinal mast assembly also includes a lower segment connected to the transverse support member, an upper segment, and a connector assembly for selectively connecting the upper segment to the lower segment. A first bearing ring is connected transversely to a topmost portion of the lower segment. A second bearing ring is connected transversely to a bottommost portion of the upper segment. The second bearing ring is placed in registration with the first bearing ring when the boom and mast apparatus is assembled. A boom member is connected to the boom-member-connected end of the longitudinal mast assembly. A winch assembly is connected to the upper segment of the longitudinal mast assembly. A winding strap is wound by the winch assembly. A bottom portion of the lower segment of the longitudinal mast assembly is hollow and receives a support leg assembly which can selectively be retracted into or extended out from the bottom portion of the lower segment. The support leg assembly includes a leg member and a base member. The leg member includes a plurality of adjustment channels.

A FIFTH EXAMPLE, U.S. Pat. No. 5,791,858, Issued on Aug. 11, 1998, to Sasser teaches a vehicle mounted game skinning device comprising a vertical support unit having a hitch connection member connected on one end to a vehicle hitch and connected on the other end to a vertical column member which slideably receives a boom arm member and a winch unit mounted on the vertical support unit and provided with a game spreader bar for raising and lowering game animals.

A SIXTH EXAMPLE, U.S. Pat. No. 6,062,974, Issued on May 16, 2000, to Williams teaches a portable, foldable structure for the dressing of game animals in the field. The present invention is a portable game support which has an upper arm with a game attachment means suspended at one end of the upper arm and a flange support attached at the terminus of the other end of the upper arm with means for attachment to a tree trunk or like vertical columnar member. The portable game animal support has a lower arm having means at one end for attachment to the tree or like vertical columnar member with the lower arm being coupled at the other end to the upper arm to provide additional strength to the portable game animal support.

A SEVENTH EXAMPLE, U.S. Pat. No. 6,089,431, Issued on Jul. 18, 2000, to Hayworth teaches a hoist for lifting game animals or other loads which comprises a boom mounted on a support column in communication with a base. The boom is rotatable relative to the base, which is insertable within a draw bar-type hitch receiver. The boom, support column and base are modular components that advantageously allow for quick assembly/disassembly of the hoist and compact storage of the hoist components. Further, the length of the hoist is adjustable to compensate for the size of the game animal or load being lifted. Additionally, a light source is attached to the hoist to illuminate the area near the hoist to increase safety during operation of the hoist. Finally, a dual draw bar for increasing the utilization of a draw bar-type hitch is included. The dual draw bar has at one end a draw bar adapter and at the opposite end a first and a second receiver section for utilization with draw bar-type accessories.

AN EIGHTH EXAMPLE, U.S. Pat. No. 6,109,855, Issued on Aug. 29, 2000 to Vela-Cuellar teaches a hoist and carrier apparatus for securing game to a vehicle. The hoist and carrier apparatus includes a device for connecting the apparatus to the vehicle and a vertical member having a first end connected to the connecting device, a second end and a pulley wheel disposed on the second end of the vertical member. A animal hoist carrier receives the animal and is releasably connected to and slideable along a length of the vertical member. A pulley is connected to and extends from the first vertical member and a cable extends from the pulley and over the pulley wheel for connecting to the animal hoist carrier. When the cable is caused to be wound on the pulley, the animal hoist carrier is caused to be pulled towards the vertical member and, upon being secured to the vertically extending member, slide upward along the length of the vertically extending member thereby raising any animal releasably secured thereto.

A NINTH EXAMPLE, U.S. Pat. No. 6,250,483, Issued on Jun. 26, 2001 to Frommer teaches a field hoist that includes a support having a post extending upwardly therefrom. A base is slidably received over the post and is freely rotatable about an axis defined by the post. The base has a winch and pivot lock mounted thereto. The pivot lock engaging and disengaging the post and the base in a desired angular orientation with respect to the axis. An angled upright has a vertical portion which is telescopically received within the base. The angled upright has a sleeve extending upwardly atop the vertical portion at a preselected angle towards the side of the base having the winch mounted thereon. A support extension is slidably received within the sleeve and extends therefrom. A winch cable has a hook mounted at one end thereof, the other end of the winch cable being attached to the winch. The winch cable extending upwardly to the sleeve, upwardly along the sleeve and the support extension, and lastly extending downwardly from the end of the support extension. An animal hanger is provided on the hook.

A TENTH EXAMPLE, U.S. Pat. No. 6,705,821, Issued on Mar. 16, 2004, to Philipps et al. teaches a game hanger apparatus which is attachable to a tow hitch of a pickup truck. The folded game hanger can be taken to the site in the bed of the truck and speedily installed in the tow hitch for hanging, cleaning and butchering large game, such as deer and small bears. The apparatus comprises a mast and fixed boom of square cross-section, and having a winch, pulleys and a spreader bar with a pair of end hooks and a pair of pins which engage a jib at the end of the boom to prevent the game from twisting. The horizontal bottom and top bars are locked in place by removable pins for operation, and unlocked by removing the pins for folding the unit for storage. The bottom bar is inserted into a tow hitch and locked in place with the hitch pin.

AN ELEVENTH EXAMPLE, U.S. Patent Office Publication No. 2004/0214515, Published on Oct. 28, 2004, to Skarlupka IV et al. teaches a game hoist and skinner apparatus for raising game off the ground and transferring it to a vehicle includes a carriage guide assembly, a sliding carriage assembly, a load attachment means, and a raising mechanism. The carriage guide assembly includes a lower member affixed to a 360 degree rotating mechanism at one end and a hitch receiver adapter affixed to the opposite end. The sliding carriage assembly includes a horizontal member having a first end opposite a second end, and the first end is affixed to a vertical member that slides along a vertical support between the upper end and the bottom end of the carriage guide. A load attachment means is secured to the second end of the sliding carriage assembly.

A TWELFTH EXAMPLE, U.S. Patent Office Publication No. 2005/0175418, published on Aug. 11, 2005, to Johnson teaches a portable deer dressing and skinning device, that attaches to a truck or ATV trailer hitch, for easily field dressing a skinning a deer at the kill site, including a frame/body, a hitch pin, a winch, wire rope sheaves, galvanized wire, snap hooks, wire rope thimbles, a spreader bar, and a lanyard.

A THIRTEENTH EXAMPLE, U.S. Pat. No. 7,059,955, Issued on Jun. 13, 2006, to Green et al. teaches a portable hoist for suspending a load, which may be an animal. The portable animal hoist may include a telescopic arm rotatable about a base. The base may be configured to be releasably attachable to many devices, one of which may be a receiver hitch on a vehicle. A winch may be attached to the telescopic arm for supporting a load. The telescopic arm may also include one or more pulleys for supporting a cable coupled to the winch. The portable hoist may be used to transport animals while being suspended by the hoist.

A FOURTEENTH EXAMPLE, U.S. Pat. No. 7,374,388, Issued on May, 20, 2008, to Holt teaches a game hoist apparatus that is attachable to a tow hitch of a pickup truck or similar vehicle. The game hoist can be taken to the site in the bed of the truck and speedily installed in the tow hitch for hanging, cleaning and butchering large game, such as deer. The hoist includes a folding tubular boom of square cross-section, and having a winch, pulleys and a spreader bar for supporting the game animal. A stabilizer fixture on the end of the boom engages the spreader bar to prevent the game from twisting. The boom is made up of two sections which are locked in place at a swivel bracket by removable pins for operation, and unlocked by removing the pins for folding the unit for storage or transit. The boom lower end is supported from an attachment bar which is inserted into a tow hitch and locked in place with the hitch pin.

It is apparent now that numerous innovations for portable animal hoist and skinning devices have been provided in the prior art that are adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a hunter arm that avoids the disadvantages of the prior art.

ANOTHER OBJECT of the present invention is to provide a hunter arm that is simple and inexpensive to manufacture.

STILL ANOTHER OBJECT of the present invention is to provide a hunter arm that is simple to use.

BRIEFLY STATED, STILL YET ANOTHER OBJECT of the present invention is to provide a hunter arm which comprises a bottom bar having a first end adapted for insertion into a trailer hitch of a pickup truck. A mast has a lower end pivotally attached by a first knuckle to a second end of the bottom bar. A first brace member has a lower end pivotally attached near the first end of the bottom bar and an upper end pivotally attached near the lower end of the mast to keep the mast in a vertical position. A boom has a first end pivotally attached by a second knuckle to an upper end of the mast. A second brace member has an upper end pivotally attached to center of the boom. An angle adjustment plate has a plurality of longitudinal notches therealong affixed to the mast. A lower end of the second brace member can engage with any one of the notches in the angle adjustment plate to vary the angle of the boom extending outwardly from the mast. A pulley assembly has an upper end connected in a removable manner to a second end of the boom. A spreader bar is centrally connected in a removable manner to a lower end of the pulley assembly. A first hook extends downwardly from a first end of the spreader bar. A second hook extends downwardly from a second end of the spreader bar. The first hook and the second hook will allow animal to hang down from the spreader bar to be skinned.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows.

Figure 1:
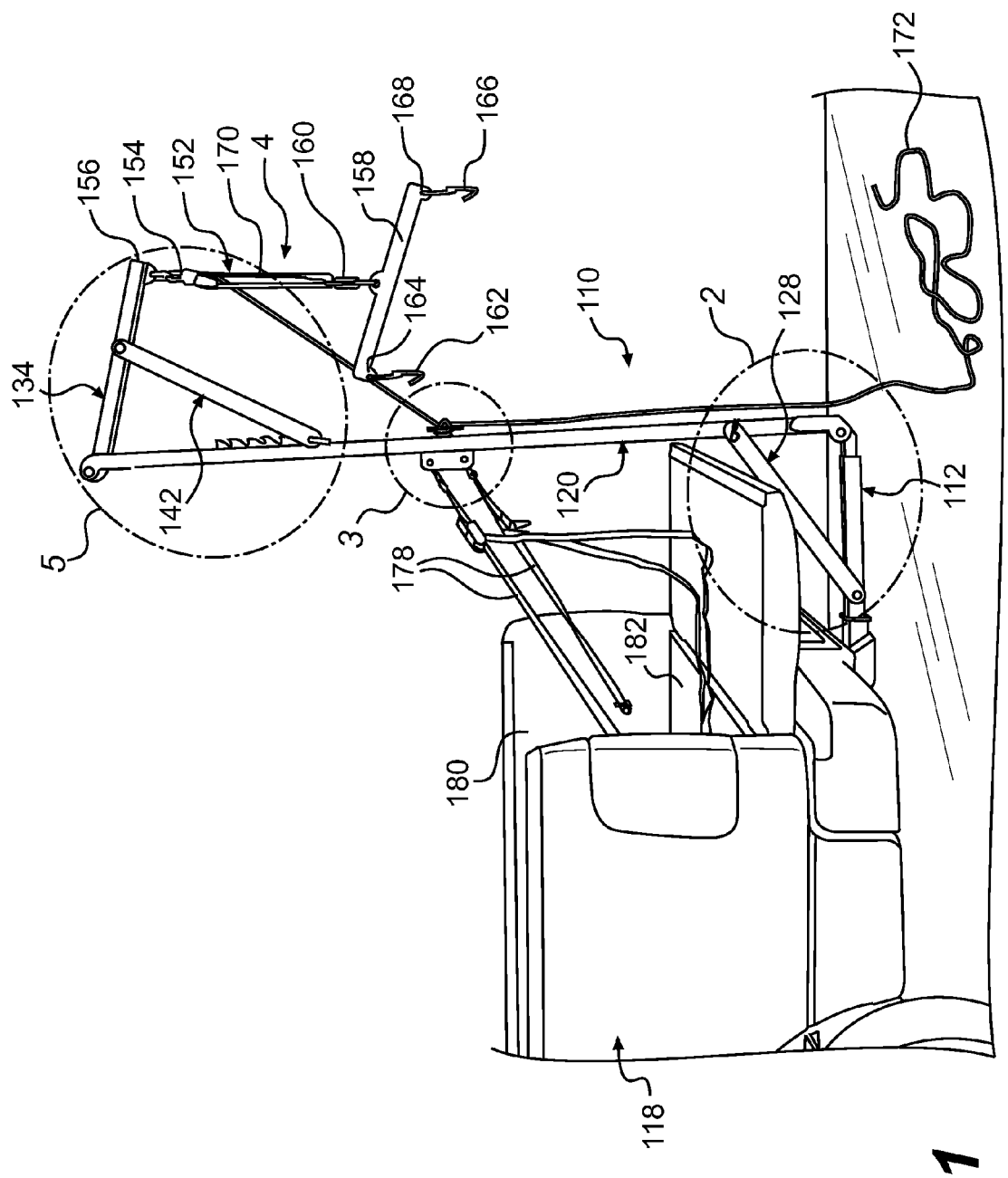
FIG. 1 is a perspective view of the present invention retained to the back of a pickup truck.

REFERENCE NUMERALS UTILIZED IN THE DRAWING 110 hunter arm
112 bottom bar of hunter arm 110
114 first end of bottom bar 112
116 trailer hitch of pickup truck 118
118 pickup truck
120 mast of hunter arm 110
122 lower end of mast 120
124 first knuckle on lower end 122
126 second end of bottom bar 112
128 first brace member of hunter arm 110
130 lower end of first brace member 128
132 upper end of first brace member 128
134 boom of hunter arm 110
136 first end of boom 134
138 second knuckle on first end 136
140 upper end of mast 120
142 second brace member of hunter arm 110
144 upper end of second brace member 142
146 angle adjustment plate of hunter arm 110
148 notch on angle adjustment plate 146
150 lower end of second brace member 142
151A upper lock pin
151B lower lock pin
152 pulley assembly of hunter arm 110
154 upper end of pulley assembly 152
156 second end of boom 134
158 spreader bar of hunter arm 110
160 lower end of pulley assembly 152
162 first hook of hunter arm 110
164 first end of spreader bar 158
166 second hook of hunter arm 110
168 second end of spreader bar 158
170 block and tackle for pulley assembly 152
172 elongated cord of block and tackle 170
174 tie down T-member on mast 120
176 retaining plate on mast 120 with upper hole 176A for lock pin 151A and a lower hole 176B for lock pin 151B
178 adjustment strap of hunter arm 110
180 interior side wall of bed 182
182 bed of pickup truck 118
G the gap or length between upper hole 176A and lower hole 176B

DETAILED DESCRIPTION OF THE PREFERRED EMBODIMENT

Figure 2:
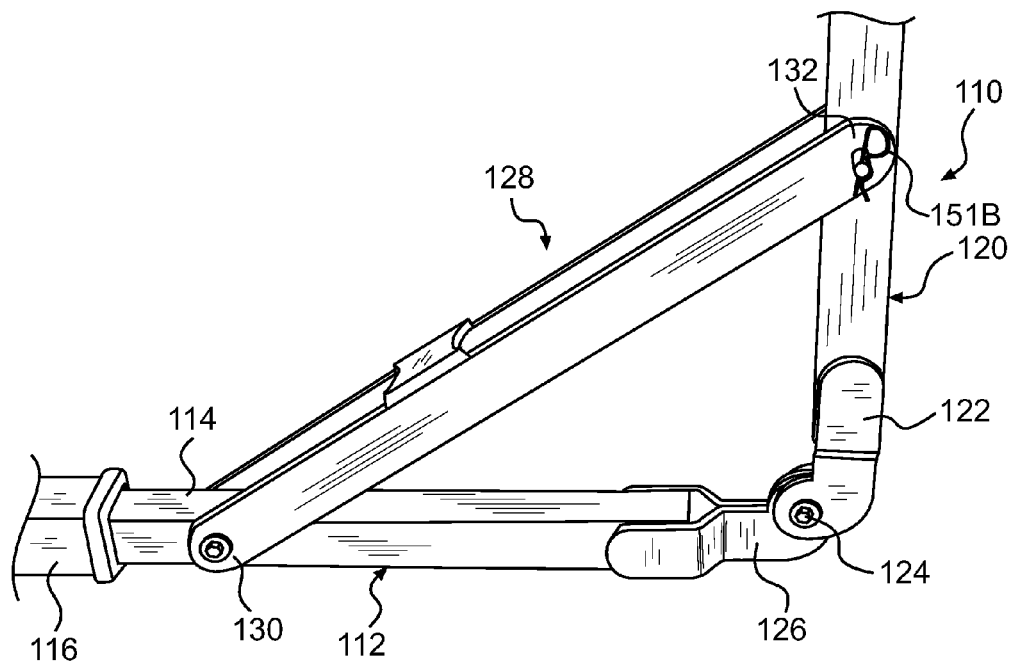
FIG. 2 is an enlarged perspective view of the dotted area in FIG. 1 as indicated by arrow 2.
Figure 3:
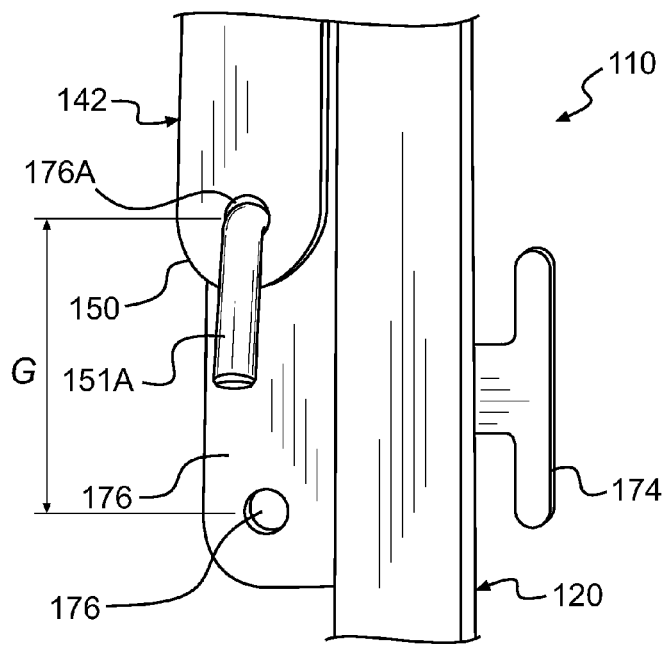
FIG. 3 is an enlarged perspective view of the dotted area in FIG. 1 as indicated by arrow 3.
Figure 4:
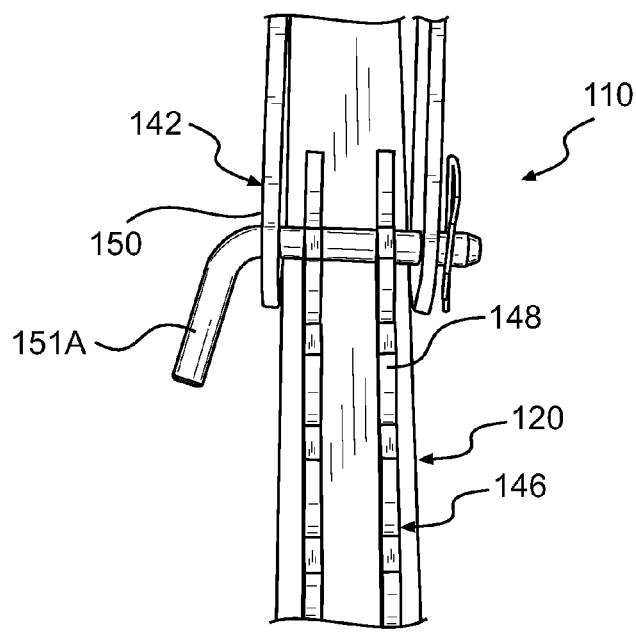
FIG. 4 is an enlarged elevational view taken in the direction of arrow 4 in FIG. 1 of a portion thereof.
Figure 5:
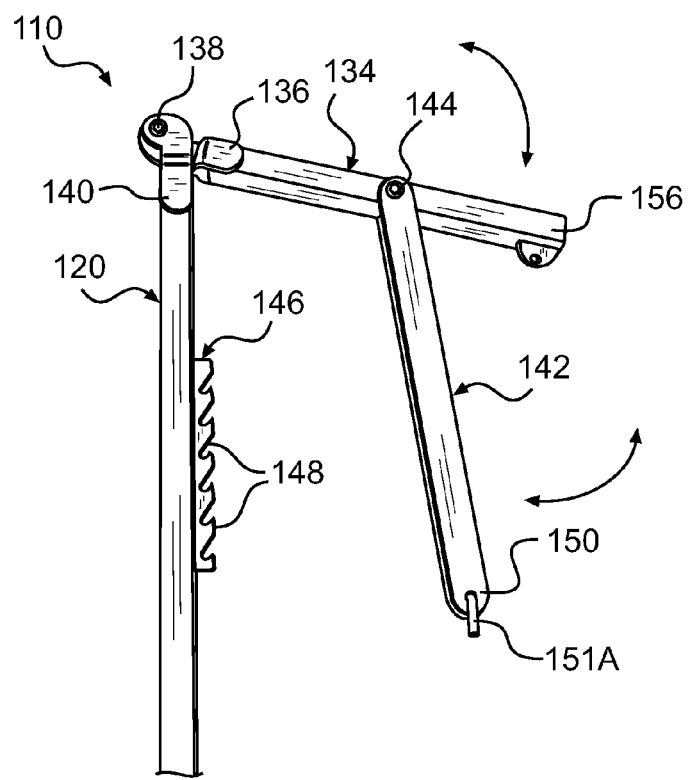
FIG. 5 is an enlarged perspective view of the dotted area in FIG. 1 as indicated by arrow 5, showing the lower end of the second brace member disengaged from the angle adjustment plate on the mast.
Figure 6:
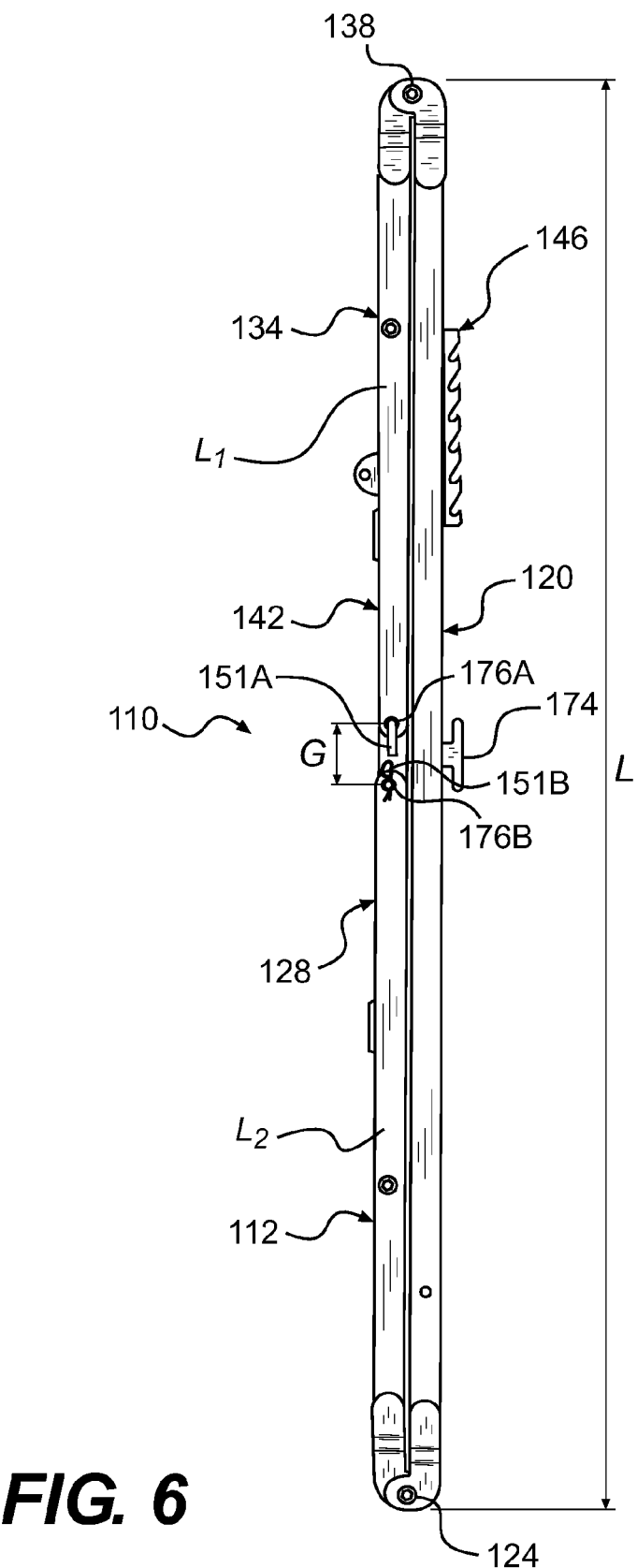
FIG. 6 is an elevational view of the present invention in a folded state with the pulley assembly and the spreader bar removed therefrom.

Referring now to the figures, in which like numerals indicate like parts, and particularly to FIGS. 1 through 6, and as such, will be discussed with reference thereto.

Referring to FIGS. 1-5: the present invention is a hunter arm 110 which comprises a bottom bar 112 having a first end 114 adapted for insertion into a trailer hitch 116 of a pickup truck 118. A mast 120 has a lower end 122 pivotally attached by a first knuckle 124 to a second end 126 of the bottom bar 112. The mast 120 has a length L of 84 inches and made of tube 2"×2". A first brace member 128 has a lower end 130 pivotally attached near the first end 114 of the bottom bar 112 and an upper end 132 pivotally attached near the lower end 122 of the mast 120 to keep the mast 120 in a vertical position. A boom 134 has a first end 136 pivotally attached by a second knuckle 138 to an upper end 140 of the mast 120. A second brace member 142 has an upper end 144 pivotally attached to center of the boom 134. An angle adjustment plate 146 has a plurality of longitudinal notches 148 therealong affixed to the mast 120. A lower end of the second brace member 142 can engage with any one of the notches 148 in the angle adjustment plate 146 to vary the angle of the boom 134 extending outwardly from the mast 120. A pulley assembly 152 has an upper end 154 connected in a removable manner to a second end 156 of the boom 134. A spreader bar 158 is centrally connected in a removable manner to a lower end 160 of the pulley assembly 152. A first hook 162 extends downwardly from a first end 164 of the spreader bar 158. A second hook 166 extends downwardly from a second end 168 of the spreader bar 158. The first hook 162 and the second hook 166 will allow animal to hang down from the spreader bar 158 to be skinned.

The pulley assembly 152 comprises a block and tackle 170 having an elongated cord 172. A tie down T-member 174 is affixed to the mast 120 below the angle adjustment plate 146 to retain the elongated cord 172 of the block and tackle 170 thereabout. A retaining plate 176 is affixed to the mast 120 opposite from the tie down T-member 174. The retaining plate 176 has an upper hole 176A for lock pin 151A and a lower hole 176B for lock pin 151B. A pair of adjustment straps 178 is each secured between the holes 175A-176B of the retaining plate 176 and interior side walls 180 of a bed 182 of the pickup truck 118 to maintain the mast 120 in a secure vertical position.

In summary, the hunter arm 110 offers users a device that can assist them by holding an animal so it can quickly and easily be skinned in the bush. The present invention has three components: a bottom bar 112, a mast 120 and a boom 134 that fold into each other as in FIG. 6. The mast 120 has a length of L 84 inches. The bottom bar 112 (length L2), the boom 134 and second brace member 142 are collapsible and are locked in place with two locking pins 151A and 151B when the hunter arm is in storage. (as in FIG. 6). As in FIG. 6, the hunter arm 110 has two knuckles 124, 138 so the bottom bar 112 and the boom 134 may easily fold outwards. The hunter arm 110 has a second brace member 142 so that the boom 134 can be angularly adjusted according to the type and size of animal to be skinned. Suspended from the boom 134 is a pulley assembly 150 with a spreader bar 158 to keep the animal's legs apart for ease of skinning and cleaning. The bottom bar 112 fits into the trailer hitch 116 with a pin to secure it in place with the mast 120 upright and supported to the bottom bar 112 by the first brace member 128 to hold it in place. For use, a person slides the bottom bar 112 into the trailer hitch 116 and lifts up the mast 120 supported by the first brace member 128. The boom 134 is then lifted up and supported by the second brace member 142. The present invention is produced from aluminum, steel or a similar, durable material in 2"×2" tube. The exact dimensions, materials used for construction and method of operation of the hunter arm 110 may vary upon manufacturing.

It will be understood that each of the elements described above, or two or more together, may also find a useful application in other types of constructions differing from the types described above.

While the invention has been illustrated and described as embodiments of a hunter arm, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A hunter arm which comprises:
    a) a bottom bar having a first end adapted for insertion into a trailer hitch of a pickup truck;
    b) a mast having a lower end pivotally attached by a first knuckle to a second end of the bottom bar;
    c) a first brace member having a lower end pivotally attached near the first end of the bottom bar and an upper end pivotally attached near the lower end of the mast to keep the mast in a vertical position;
    d) a boom having a first end pivotally attached by a second knuckle to an upper end of the mast;
    e) a second brace member having an upper end pivotally attached to center of the boom;
    f) an angle adjustment plate having a plurality of longitudinal notches therealong affixed to the mast, wherein a lower end of the second brace member can engage with any one of the notches in the angle adjustment plate to vary the angle of the boom extending outwardly from the mast;
    g) a pulley assembly having an upper end connected in a removable manner to a second end of the boom;
    h) a spreader bar centrally connected in a removable manner to a lower end of the pulley assembly;
    i) a first hook extending downwardly from a first end of the spreader bar; and
    j) a second hook extending downwardly from a second end of the spreader bar, wherein the first hook and the second hook will allow animal to hang down from the spreader bar to be skinned.

2. The hunter arm as recited in claim 1, wherein the pulley assembly comprises a block and tackle having an elongated cord.

3. The hunter arm as recited in claim 2, further comprising a tie down T-member affixed to the mast below the angle adjustment plate to retain the elongated cord of the block and tackle thereabout.

4. The hunter arm as recited in claim 3, further comprising a retaining plate affixed to the mast opposite from the tie down T-member.

5. The hunter arm as recited in claim 4, further comprising a pair of adjustment straps secured between the upper and lower holes of the retaining plate and interior side walls of a bed of the pickup truck to maintain the mast in a secure vertical position.

6. The hunter arm as recited in claim 1, wherein the mast has a length of 84 inches.

7. The hunter arm as recited in claim 1, wherein the bottom bar 112 (length L2), the boom 134 and second brace member 142 are collapsible and are locked in place with two locking pins 151A and 151B when the hunter arm is in storage.

8. The hunter arm as recited in claim 1, wherein the hunter arm elements are made of aluminum, steel or durable material.

9. The hunter arm as recited in claim 1, wherein the hunter are elements are made of 2"×2" tube.

* * * * *